ANALOG TO DIGITAL CONVERTER

Filed May 20, 1959 2 Sheets-Sheet 1

INVENTOR.
RICHARD M. JEPPERSON
BY Walter J. Madden, Jr.
ATTORNEY

ANALOG TO DIGITAL CONVERTER

Filed May 20, 1959 2 Sheets-Sheet 2

ANALOG INPUT = 95

| V/1 | -80 | | V/2 | -40 | | V/4 | -20 | | V/8 | -10 | | V/16 | -5 | |
|---|---|---|---|---|---|---|---|---|---|---|---|---|---|---|
| S12 | a | 95 | S22 | a | +15 | S32 | a | +15 | S42 | a | +15 | S52 | a | +5 |
| | b | -80 | | b | -40 | | b | -20 | | b | -10 | | b | -5 |
| | c | +15 | | c | -25 | | c | -5 | | c | +5 | | c | 0 |
| Z14 | a | +15 | Z24 | a | -25 | Z34 | a | -5 | Z44 | a | +5 | Z54 | a | 0 |
| | b | 0 | | b | 155 | | b | 155 | | b | 0 | | b | 0 |
| O26 | a | +15 | O36 | a | -25 | O46 | a | -5 | O56 | a | +5 | | | |
| | b | 0 | | b | +15 | | b | +15 | | b | 0 | | | |
| | c | +15 | | c | +15 | | c | +15 | | c | +5 | | | |
| A25 | a | +95 | A35 | a | +15 | A45 | a | +15 | A55 | a | +5 | | | |
| | b | 0 | | b | 155 | | b | 155 | | b | 0 | | | |
| | c | 0 | | c | +15 | | c | +15 | | c | 0 | | | |
| BINARY OUTPUT | | 1 | | 0 | | | 0 | | | 1 | | | 1 | |

FIG. 2

United States Patent Office 3,119,105 Patented Jan. 21, 1964

3,119,105

ANALOG TO DIGITAL CONVERTER

Richard M. Jepperson, San Jose, Calif., assignor to International Business Machines Corporation, New York, N.Y., a corporation of New York Filed May 20, 1959, Ser. No. 814,480
5 Claims. (Cl. 340—347)

Figure 1:
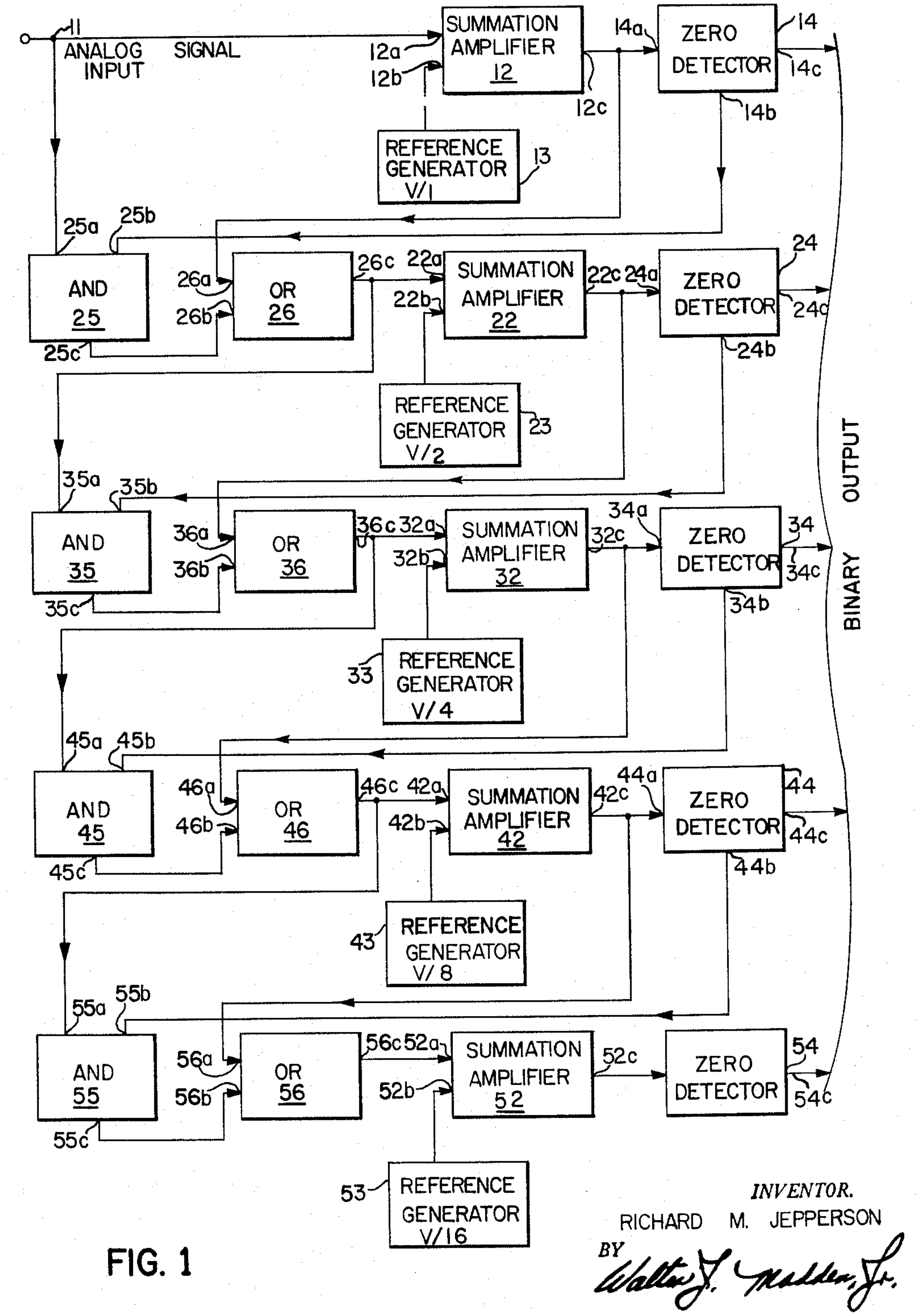

This invention relates in general to analog to digital converters.

Analog to digital converters of the so called weighing type are well known in the art. Generally, such converters are electronic circuit arrangements in which an analog input signal is applied to the network and a plurality of digital output signals are produced in the particular digital code being used. Such converters include a plurality of successive stages in which the amplitude of the analog input signal is compared with the amplitudes of a plurality of different reference signals. In the first comparison stage, if the amplitude of the analog input is greater than the reference signal amplitude for that stage, a digital output signal is produced for that stage and the difference between the analog signal and the reference signal is passed to the succeeding stage for comparison with the reference signal for that stage. If, however, the analog input signal is less than the reference signal, then no digital output signal is produced for that stage and the whole analog signal is passed to the following stage where the comparison operation is performed with the reference signal for that stage. This operation is repeated for the successive comparison stages so that the analog signal is broken down into a plurality of digital quantities which in combination represent the amplitude of the analog signal. Such systems have the disadvantage, however, that each of the comparison operations requires that the analog signal be passed through a comparison network regardless of whether the analog signal (or a portion thereof) is larger or smaller than the reference signal with which it is to be compared. This successive comparison of the analog input is objectionable because the non-linear characteristics of the comparison networks utilized tend to produce distortion of the analog waveform passing therethrough, thus seriously affecting the accuracy of the system, particularly where a larger number of such comparisons are performed on a given analog signal.

Broadly, the present invention contemplates analog to digital converter apparatus of the weighing type in which the amplitude of the analog input signal is compared with the amplitudes of a plurality of differenent reference voltages. The arrangement of circuitry is such that if the amplitude of the analog signal (or a portion thereof) is less that the amplitude of the reference voltage for that given stage, indicating that no digital output is to be produced from that stage, the analog signal does not pass through the comparison network for that stage, but is passed directly to the succeeding comparison stage. The analog signal thus passes through only those comparison networks in which the amplitude of the analog input signal is greater than the amplitude of the reference voltage for that stage. Thus, the system of the present invention eliminates passing the analog input signal through comparison networks where no useful comparison is performed, and hence eliminates needless distortions of the analog waveform.

It is therefore an object of present invention to provide improved analog to digital conversion apparatus.

It is a further object of present invention to provide analog to digital conversion apparatus utilizing a plurality of comparison circuits through which the analog signal may be passed for comparison with a plurality of different reference signals, in which the analog signal is passed through only those comparison circuits in which the amplitude of the analog signal exceeds the amplitude of the associated reference signal.

Other objects of the invention will be pointed out in the following description and claims and illustrated in the accompanying drawings which disclose, by way of example, the principle of the invention and the best mode which has been contemplated of applying that principle.

In the drawings:

FIG. 1 is a schematic illustration of apparatus for carrying out the present invention; and FIG. 2 is a chart showing the magnitudes of the signal levels at the different points in the apparatus of FIG. 1 in connection with the conversion to digital form of a representative analog quantity.

Referring to FIG. 1, reference numeral 11 designates an input terminal to which an analog signal to be converted to digital form is supplied. Such a signal may be of any suitable type which is to be converted into digital form in accordance with the present invention. In the illustrated embodiment, it has been assumed that the converter include five stages of comparison which will produce five possible digital output signals. It has been further assumed for illustrative purposes that the five stages correspond to magnitudes of 80, 40, 20, 10 and 5, respectively, so that any analog quantity from zero to 155 may be represented to the nearest even multiple of five by various combinations of the digital output signals from the five comparison stages. It will be understood that additional stages of comparison may be provided for producing additional accuracy in digitizing the analog input signal, although the five stages illustrated in FIG. 1 provide an accuracy commensurate with the resolution of the overall system.

The analog signal is supplied to one input 12*a* of a summation amplifier 12 where the analog signal is compared in amplitude with a suitable reference signal. Summation amplifier 12 is one of a series of such amplifiers 12, 22, 32, 42 and 52 which are provided for the five stages of comparison in the converter. The reference signal may be generated in a reference generating network 13 which is one of a series of such networks 13, 23, 33, 43 and 53 which generate different reference voltages. Using the assumed five levels of comparison in the converter illustrated in FIG. 1, reference network 13 will generate a reference signal having an amplitude of 80, network 23 will generate a reference signal having an amplitude of 40, network 33 will generate a reference signal having an amplitude of 20, network 43 will produce a reference signal having an amplitude of 10, and network 53 will produce a reference signal having an amplitude of 5. Summation amplifier 12 may be of any suitable known type in which the amplitudes of the input signals are compared to produce an output signal having an amplitude proportional to the algebraic sum of the amplitudes of the input quantities. For example, summation amplifier 12 may be a D.C. amplifier employing feedback so that the output signal is the algebraic sum of the two input signals.

The output from summation amplifier 12, which output represents the algebraic sum of the two input signals, is supplied to the input 14*a* of a zero detector network 14 which is one of a series 14, 24, 34, 44 and 54 of similar devices. Zero detector 14 senses the polarity of the output signal from amplifier 12 and produces an output signal which varies in amplitude in accordance with the sensed polarity. In the present embodiment, the output conductor 14*b* of zero detector 14 has a potential of zero in response to a positive algebraic sum from amplifier 12 and has a high potential in response to an algebraic sum of zero or of a negative polarity. Thus, when the analog input signal to summation amplifier 12 exceeds the amplitude of the negative reference signal from network 13, the output of summation amplifier 12 is a positive quantity representing the difference, and this positive quantity causes the output of zero detector 14 to be substantially zero. Each of detectors 24, 34, 44 and 54 are provided with output conductors 24b, 34b, 44b and 54b which are similar to conductor 14b.

Each of zero detectors 14, 24, 34, 44 and 54 also has an output conductor 14c, 24c, 34c, 44c and 54c which follows the potential of the other associated one of the output conductors 14b, 24b, 34b, 44b and 54b and on which appears the digital output pulse representing the output from the converter. In the present embodiment, it is assumed that when an output conductor is high, a binary "0" is produced and when an output conductor is low a binary "1" is produced, and it is further assumed that the presence of a binary "1" represents an output from that particular stage and that the presence of a binary "0" represents no output.

The output signal from zero detector 14 is supplied to one input 25b of a two input AND gate 25 which receives at its other input 25a the analog signal from terminal 11. The AND gates described herein, together with the OR gates subsequently described, may be of any suitable type well known in the data processing art, such as those illustrated and described at pages 37 and 38 in High Speed Computing Devices, Engineering Research Associates, Inc., 1950. When the output of zero detector 14 is zero, AND gate 25 is not open so that the analog input signal from terminal 11 does not pass through gate 25. When the algebraic sum from amplifier 12 is zero or of a negative polarity, the potential of the output conductor 14b of zero detector 14 rises to supply a positive input to AND gate 25 to pass the analog signal from terminal 11 through gate 25. From gate 25 the signal goes to one input 26b of a two input OR gate 26 which is one of a series of similar OR gates 26, 36, 46 and 56. The other input to OR gate 26 at terminal 26a is supplied from the output conductor 12c of summation amplifier 12.

The output from OR gate 26 is supplied in parallel to the input 22a of the second stage summation amplifier 22 and to the input 35a of the second stage AND gate 35. Summation amplifier 22 receives one input from OR gate 26 and receives a reference input from reference generating network 23, which, as indicated above, generates a reference signal whose amplitude is one-half the amplitude of the reference signal from network 13. Summation amplifier 32 produces an output signal at terminal 22c having a magnitude and a polarity depending upon the algebraic sum of the two input signals. The output from summation amplifier 22 is supplied to zero detector network 24, which, like zero detector 14, produces a zero output when receiving a positive input and produces a high output when its input is zero or of a negative polarity. The output from zero detector 24 is supplied to the input 35b of AND gate 35 to open this gate when the output signal is high.

On the basis of the above description, it will be seen that the present invention operates to compare the analog input signal with a reference signal to extract a difference which is passed to the next stage for comparison with another reference signal in each of the stages of comparison, if the analog signal (or a portion thereof) being compared is less than the reference signal for that stage, the zero detector network for that stage operates to effectively bypass the analog signal to the next stage for comparison, without requiring that the analog signal pass through the comparison summation amplifier for that stage. This operation results from the fact that the analog signal is supplied in parallel to the summation amplifier and to the associated AND gate, so that when the output from the zero detector network rises in response to a negative or zero difference signal from the associated summation amplifier, the associated AND gate is opened to pass the analog signal directly through this AND gate without requiring that the signal go through the comparison network in the summation amplifier. Thus, when a comparison operation indicates that the particular binary digit represented by that stage is not required to produce the digital representation of the analog signal, the analog signal effectively bypasses this stage so that no unnecessary distortion of the analog signal is produced.

The operation of the present invention can best be understood by reference to the chart of FIG. 2 which graphically shows the voltage levels appearing at different points in the apparatus of FIG. 1 in converting a representative analog signal into binary form. In the example illustrated in FIG. 2, it is assumed that an analog signal having an amplitude of 95 units is to be converted to binary form by means of the five binary comparison stages illustrated in FIG. 1. In FIG. 2 the symbols $S_{12}$, $S_{22}$, $S_{32}$, $S_{42}$ and $S_{52}$ represent the summation amplifiers corresponding to those numerical subscripts; $A_{25}$, $A_{35}$, $A_{45}$ and $A_{55}$ represent the AND gates identified by these numerical subscripts; $O_{26}$, $O_{36}$, $O_{46}$ and $O_{56}$ represent the OR gates identified by these numerical subscripts; and $Z_{14}$, $Z_{24}$, $Z_{34}$, $Z_{44}$ and $Z_{54}$ represent the zero detector networks of the same numerical subscripts.

The analog signal having an amplitude of 95 units appears at terminal 11 and is supplied as one input at terminal 12a of summation amplifier 12 where it is compared with the reference signal from reference generator 13. In the particular assumed example, the negative reference voltages from networks 13, 23, 33, 43 and 53 have amplitudes of 80, 40, 20, 10 and 5, respectively, as indicated above. Hence, the analog signal of 95 units from terminal 11 is compared in summation amplifier 12 with the −80 unit signal from network 13 to produce at output terminal 12c a signal of +15 units representing the algebraic sum of the signals. This signal of +15 units is supplied as the input to zero detector 14 to produce an output signal of zero from that detector. Thus, AND gate 25 remains closed so that the analog signal of 95 units on terminal 25a does not pass through gate 25. The output of +15 units from summation amplifier 12 is thus applied to input terminal 26a of OR gate 26 and is passed through this OR gate to the input of summation amplifier 22 for the next stage of comparison. It will also be noted that when the output 14b of zero detector 14 goes to zero in response to the positive signal from amplifier 12, conductor 14c also goes to zero to indicate a binary "1" from this comparison stage.

The signal of +15 units from gate 26 is supplied to the input of amplifier 22 where it is compared with the reference signal from reference generator 23. The reference signal from generator 23 has an amplitude of −40, so that the output from summation amplifier 22 has an amplitude of −25. This signal of −25 units is supplied to the input of zero detector 24 where it causes the output of zero detector 24 to rise. In the present example, it is assumed that the high output of the zero detector has an amplitude of 155 units and this signal is supplied to input 35b of AND gate 35. This opens gate 35 to permit the signal on input terminal 35a to pass through the gate. It will be seen that the signal which is on terminal 35a is the signal of +15 from OR gate 26, which signal represents the difference from the comparison operation in the first stage summation amplifier 12. That is, since the digital representation for the "40" stage is not required to produce the digital output for the analog quantity "95," the analog signal does not pass through the summation amplifier for this stage. This difference signal of +15 thus effectively bypasses summation amplifier 22 so that no possible distortion is introduced into the signal by the amplifier.

The output signal of −25 units which appears at the output 22c of summation amplifier 22 and which is supplied to zero detector 24 is also supplied to the input of OR gate 36, but owing to the negative polarity of this signal, it is not passed through the OR gate. Hence, only the signal of +15 units of AND gate 35 passes through OR gate 36 to the input of summation amplifier 32 where it is compared with the reference signal of −20 units from the reference generator 33. Summation amplifier 32 measures the algebraic sum of the two inputs to produce an output of −5 which is passed to zero detector 34 to cause the output of this zero detector to rise to its high value. This action opens gate 45 to pass the +15 signal from OR gate 36 directly through AND gate 45 to OR gate 46. At the same time, the output signal of −5 from summation amplifier 32 is supplied as another input to OR gate 46, but owing to its negative polarity, it is not passed through this OR network.

Thus the signal of +15 units again bypasses a summation amplifier, this time amplifier 32, and is passed directly to the summation amplifier 42 of the succeeding stage. In this amplifier the signal of +15 units is compared with a reference signal of −10 units from reference generator 43 to produce an output at terminal 42c of +5 units. This signal of +5 units causes the potential of the output conductor 44b of zero detector 44 to drop to zero, thereby supplying a zero signal to terminal 55b of AND gate 55 to close this gate. Thus the signal from OR gate 46 does not bypass the summation amplifier 42, as it did in the two preceding stages, since AND gate 55 is closed. The signal of +5 units from summation amplifier 42 is supplied through OR gate 56 to the input 52a of summation amplifier 52. Summation amplifier 52 receives a reference input signal on terminal 52b of −5 units from reference generator 53 so that amplifier 52 produces an algebraic sum of zero. This zero output from summation amplifier 52 causes the potential of the output of zero detector 54 to drop to its low value, indicating the presence of a binary "1" from that stage.

Thus, in the assumed example, the output of zero detector 14 is high, indicating a binary "1" for the 80 stage of the converter; the outputs of zero detectors 24 and 34 are low; indicating binary "0" for the 40 and 20 stages of the converter; and the outputs of zero detectors 44 and 54 are high indicating the presence of a binary "1" in each of the 10 and 5 stages of the converter. The presence of a binary "1" on each of the 80, 10 and 5 stages thus provides a digital measure of the analog signal of 95 at input terminal 11.

In summation, the analog input signal is compared with a different reference voltage in each of a plurality of succeeding stages, and if the result of this comparison is a positive quantity indicating that the amplitude of the analog signal exceeds that of the reference signal, a binary "1" is produced for that stage and the difference resulting from the comparison is passed to the succeeding stage. However, if the result of the comparison is a negative quantity indicating that the reference voltage exceeds the analog signal voltage and consequently indicating that no binary "1" will be required for that stage, the analog signal is effectively bypassed around the summation amplifier for that stage and sent directly to the comparison network for the succeeding stage, thus eliminating the needless passing of the analog signal through some of the summation amplifiers with the possibility of producing nonlinear distortion therein.

While there have been shown and described and pointed out the fundamental novel features of the invention as applied to the preferred embodiment, it will be understood that various omissions and substitutions and changes in the form and details of the device illustrated and in its operation may be made by those skilled in the art, without departing from the spirit of the invention. It is the intention, therefore, to be limited only as inidcated by the scope of the following claims.

What is claimed is:

1. An analog-to-digital coder for generating representations of the instantaneous amplitude of an analog wave, said coder comprising a plurality of cascading stages, each stage comprising:
   - an associated signal input means;

- means for generating an associated reference voltage;
   - a difference generating network for comparing the amplitude of the signal applied to the associated input means to the associated reference voltage and for generating a different signal representative of the difference therebetween;
   - first signal path means for passing said different signal to the input means of the succeeding stage when the signal applied to the associated input means exceeds said reference signal; and
   - second signal path means for bypassing said difference generating network and for passing the signal applied to the associated input means directly to the input means of the succeeding stage when the associated reference voltage exceeds the signal applied to the associated input means.

2. An analog-to-digital coder for generating representations of the instantaneous amplitude of an analog wave, said coder comprising a plurality of cascading stages, each stage comprising:
   - an associated signal input means;
   - means for generating an associated reference voltage, the reference voltage in each successive stage having a smaller absolute magnitude than the reference voltage in the preceding stage;
   - a difference generating network for comparing the amplitude of the signal applied to the associated input means to the associated reference voltage and for generating a different signal representative of the difference therebetween;
   - first signal path means for passing said different signal to the input means of the succeeding stage when the signal applied to the associated input means exceeds said reference signal; and
   - second signal path means for bypassing said difference generating network and for passing the signal applied to the associated input means directly to the input means of the succeeding stage when the associated reference voltage exceeds the signal applied to the associated input means.

3. An analog-to-digital coder for generating representations of the instantaneous amplitude of an analog wave, said coder comprising a plurality of cascading stages, each stage comprising:
   - an associated signal input means;
   - means for generating a negative reference voltage;
   - a difference generating network for comparing the amplitude of the signal applied to the associated input means to the associated reference voltage and for generating a combined signal representative of the algebraic sum thereof;
   - first signal path means for passing said combined signal to the input means of the succeeding stage when the signal applied to the associated input means exceeds said reference signal; and
   - second signal path means for bypassing said difference generating network and for passing the signal applied to the associated input means directly to the input means of the succeeding stage when the associated reference voltage exceeds the signal applied to the associated input means.

4. An analog-to-digital coder for generating representations of the instantaneous amplitude of an analog wave, said coder comprising a plurality of cascading stages, each stage comprising:
   - an associated signal input means;
   - means for generating a negative reference voltage, the reference voltage in each successive stage having a smaller absolute magnitude than the reference voltage in the preceding stage;
   - a difference generating network for comparing the amplitude of the signal applied to the associated input means to the associated reference voltage and for generating a different signal representative of the difference therebetween;

first signal path means for passing said different signal to the input means of the succeeding stage when the signal applied to the associated input means exceeds said reference signal; and second signal path means for bypassing said difference generating network and for passing the signal applied to the associated input means directly to the input means of the succeeding stage when the associated reference voltage exceeds the signal applied to the associated input means.

5. An analog-to-digital coder for generating representations of the instantaneous amplitude of an analog wave, said coder comprising a plurality of cascading stages, each stage comprising:

an associated signal input means;

means for generating a negative reference voltage, the reference voltage in each successive stage having a smaller absolute magnitude than the reference voltage in the preceding stage;

a difference generating network comprising difference generating means for generating a difference signal representative of the algebraic sum of the signal applied to the associated input means and the associated reference voltage, and detector means for detecting when said sum is positive;

first signal path means responsive to said zero detector means for passing said difference signal to the input means of the succeeding stage when said sum is positive; and second signal path means for bypassing said difference generating means and for passing the signal applied to the associated input means directly to the input means of the succeeding stage when said sum is negative.

References Cited in the file of this patent

UNITED STATES PATENTS

| | | |
|---|---|---|
| 2,570,221 | Earp | Oct. 9, 1951 |
| 2,715,678 | Barney | Aug. 16, 1955 |
| 2,733,432 | Breckman | Jan. 31, 1956 |
| 2,754,503 | Forbes | July 10, 1956 |
| 2,762,038 | Lubkin | Sept. 4, 1956 |
| 3,041,469 | Ross | June 26, 1962 |

OTHER REFERENCES

Suskind, A. K.: Notes on Analog-Digital Conversion Techniques, Technology Press, Massachusetts Institute of Technology, 1957 (FIGS. 5–36 and pp. 5–56 to 5–60 relied upon; FIGS. 5–36 is included in these pages).